Figure 1:
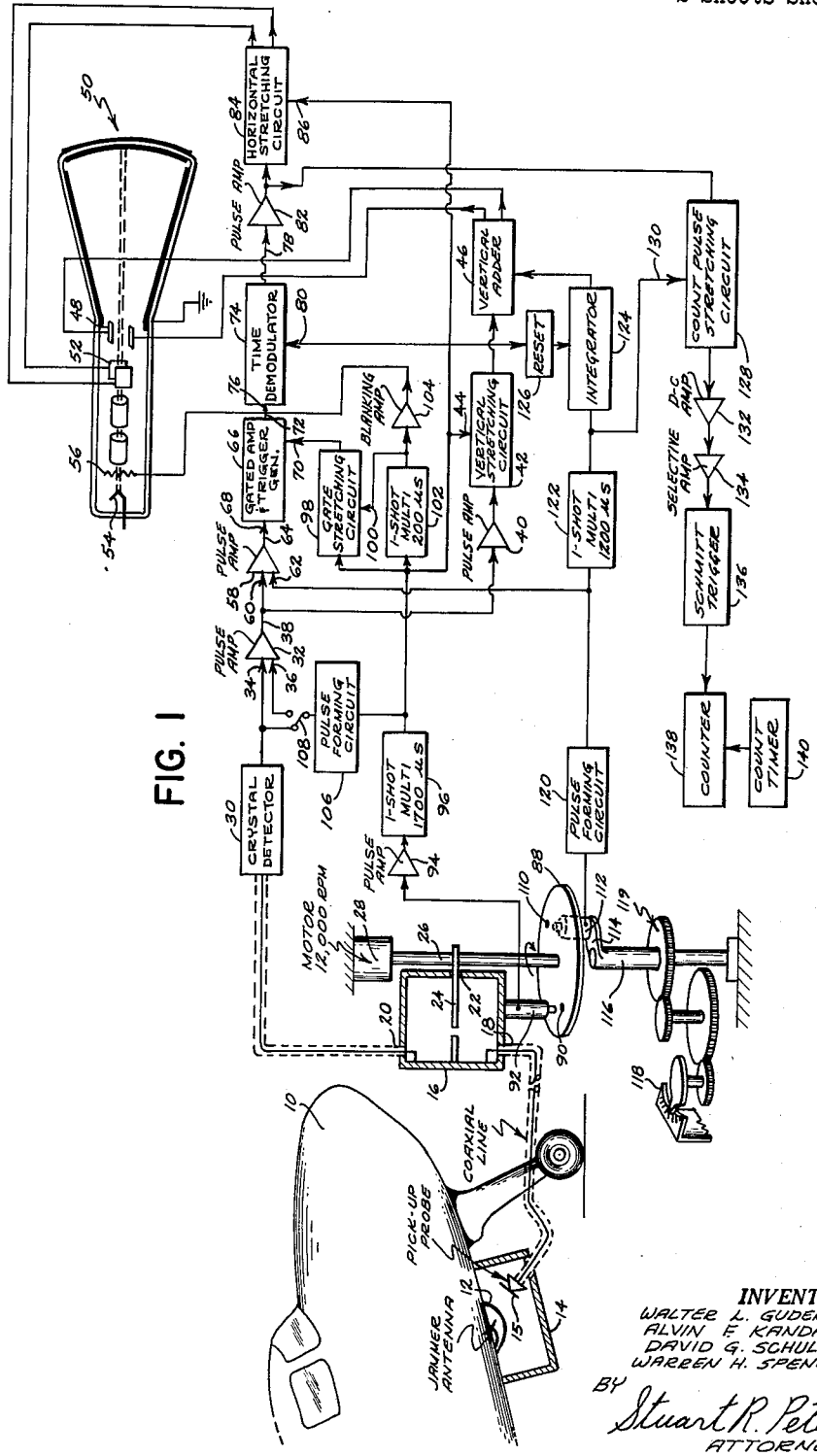

May 15, 1962 W. L. GUDERIAN ET AL 3,035,229
BROADBAND SPECTRUM ANALYZER FOR TESTING JAMMERS AND THE LIKE
Filed Oct. 15, 1959 2 Sheets-Sheet 1

INVENTORS
WALTER L. GUDERIAN
ALVIN E. KANDA
DAVID G. SCHULZ
WARREN H. SPENCER
BY
Stuart R. Peterson
ATTORNEY United States Patent Office 3,035,229
Patented May 15, 1962

3,035,229
BROADBAND SPECTRUM ANALYZER FOR TESTING JAMMERS AND THE LIKE
Walter L. Guderian, Alvin F. Kanda, David G. Schulz, and Warren H. Spencer, Minneapolis, Minn., assignors to General Mills, Inc., a corporation of Delaware
Filed Oct. 15, 1959, Ser. No. 846,702
11 Claims. (Cl. 324—77)

This invention relates generally to broadband spectrum analyzers which will find especial utility in the testing of electronic counter measure transmitters, or as these counter measure transmitters are more commonly termed, "jammers."

One object of the invention is to provide a broadband spectrum analyzer for testing jamming equipment which will provide an effective evaluation of jammer transmitters as to their operating frequency and their intended power ranges. More specifically, it is within the contemplation of the invention to measure the power output of the jammer transmitter as a function of frequency and it is an aim of the invention to do this without searching for the jammer band limits and without having to synchronize the tester with the equipment being checked. In its more practical aspects, the tester forming the subject matter of the instant invention will be capable of covering all frequency bands from 950 to 10,000 megacycles. It will also measure jammer power at sweep rates up to one megacycle. Furthermore, it will possess a calibration accuracy of about ±0.2%.

Another object of the invention is to provide a visual display that permits the operator to determine readily if modulation (either amplitude or frequency) is present in the jammer output. As to the types of display possible, it should be mentioned that the proposed test equipment will evaluate the operation of the sweep mechanism within the jammer by displaying the frequency-vs.-time characteristic of the jammer output. The envisioned system also provides an indication of the jammer sweep rates in cycles per second. Still another feature resides in the provision for detecting the presence of moding. As to the measuring of frequency, it is easy with the analyzer or tester forming the subject of the instant invention to produce a precise, internally generated frequency marker that appears in the visual display and which serves as a reference for denoting the frequency of output signal from the transmitter undergoing test.

Another object of the invention is to provide an analyzer that is portable so that it can be moved from aircraft to aircraft when testing jamming equipment to give a rapid and comprehensive indication of the performance of each individual transmitter.

Still another object is to provide a tester of the foregoing character that does not require connection to any component within the aircraft. In this respect, while most of the testing will undoubtedly take place in the vicinity of the individual aircraft, nonetheless the present invention permits block testing by replacing the hood that is utilized in outdoor testing with a directional coupler in the radio-frequency line of the jammer transmitter.

Quite briefly, a tester constructed in accordance with the teachings of the instant invention includes a microwave absorbing hood which is readily placed over the antenna of the transmitter being tested. This hood absorbs the radiated energy from the antenna, isolates the antenna from adjacent antennas, and feeds a signal of a calibrated level in relation to the radiated energy to the tester through a coaxial cable. The energy so fed is directed into a high-Q, fast-swept, mechanically-tuned cavity. Each time the cavity passes through the frequency of the transmitted energy, output from the cavity is obtained. This radio frequency output energy is detected, amplified, and stretched for display as a vertical displacement on an oscilloscope. The horizontal deflection of the oscilloscope beam is in accordance with the tuning of the cavity. Thus a display of jammer output power (vertical) vs. jammer frequency (horizontal) is produced on the oscilloscope.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 2:
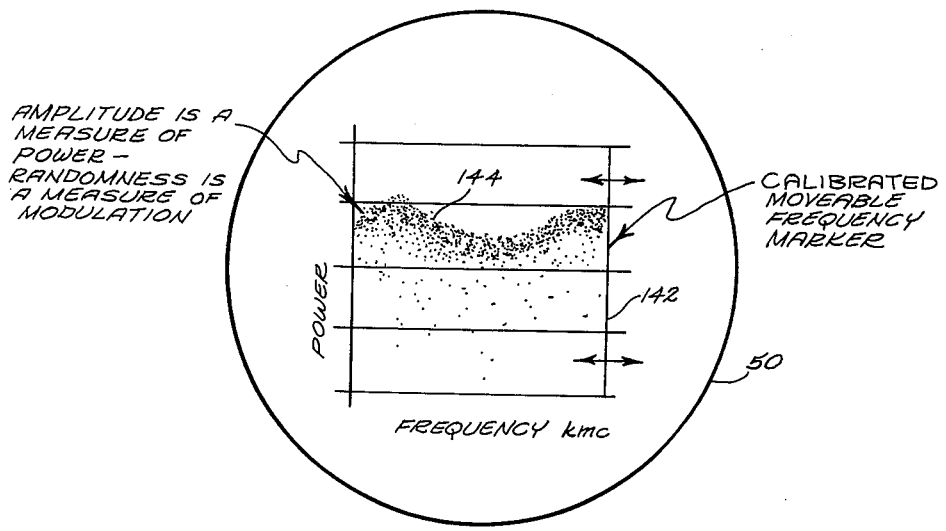
Figure 3:
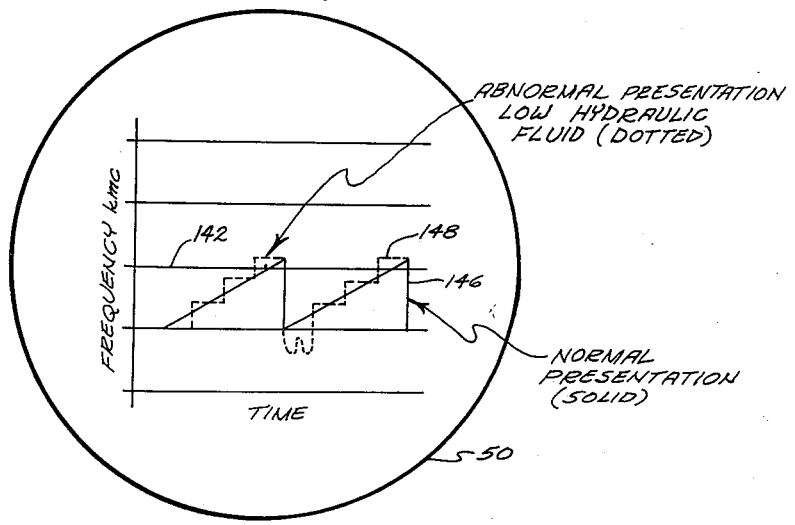

In the drawing:

FIGURE 1 is a block diagram of the analyzing apparatus with certain portions thereof being illustrated somewhat schematically, and FIGS. 2 and 3 illustrate two types of displays that are possible with the apparatus pictured in FIG. 1.

Referring now in detail to FIG. 1, it will be observed that a portion of an aircraft 10 has been depicted, this aircraft carrying a jammer or electronic counter measure transmitter antenna 12.

The broadband spectrum analyzer or test apparatus itself includes an antenna hood 14 lined with microwave-absorbent material (not illustrated) via which power sampling is accomplished. A small probe 15 is located inside the hood. Not shown, but co-acting with the sheathing of the hood over the antenna 12 is a rigid insulating positioner which fits closely around the antenna base.

Associated with the antenna hood 14 is a cavity 16 having an input terminal 18, an output terminal 20 and a slot 22 centered at the voltage maxima. The input and output terminals, which are coaxial, are coupled to the magnetic field with loops. The sweeping means includes a thin tuning blade or vane 24 mounted on a rotatable shaft 26 so that it can dip in and out of the cavity 16 through the previously mentioned slot 22. The shaft 26 is driven by a 12,000 r.p.m. motor labelled 28. Although leakage from the cavity will be small, suitable chokes can be employed in conjunction with the shaft 26 to minimize further undesired losses.

Continuing with the description of the analyzing apparatus, it will be observed that the output terminal 20 is connected to a crystal detector 30. The output from the detector 30 is fed to a pulse amplifier 32, this amplifier having a first input 34 which is connected to the detector 30, a second input 36 for a purpose to be described later, and an output 38. The output 38 leads to a pulse amplifier 40. The output of the amplifier 40 in turn is connected to what will be termed a vertical stretching circuit 42. This stretching circuit has a timing gate control or reset channel denoted by the numeral 44. While stretching circuits of the contemplated type are conventional, nonetheless it should be pointed out that these circuits are sometimes called box car generators. This type of circuitry is adequately described in section 10.1 of volume 24 of the Radiation Laboratory Series (1950) published by the McGraw-Hill Book Company, Inc. After stretching, the signal is applied through an adder 46 to vertical deflecting plates 48 and a cathode ray oscilloscope designated generally by the reference numeral 50. Since the amplitude of the cavity output pulse is an indication of the jammer transmitter power, in order to preserve the amplitude characteristics of the signal, the circuits from the crystal detector 30 to the vertical deflecting plates 48 of the oscilloscope are linear.

This oscilloscope, as is conventional, also includes horizontal deflecting plates 52 which will be more specifically referred to hereinafter. Likewise, the oscilloscope contains an electron gun 54 having a cathode and control grid 56 which is utilized in a subsequently referred to blanking operation.

Going back now to the output 38 of the pulse amplifier 32, it will be observed that another tube input pulse amplifier 58 is employed, this amplifier having a first input 60, a second input 62, and an output 64. A gated amplifier and trigger generator 66 has a first input 68 connected to the output 64 of the pulse amplifier 58. The amplifier 66 also has a second input which will be dealt with more specifically later on, and of course has an output which bears the reference numeral 72. A time demodulator 74 is provided with an input 76 connected to the output 72 and also has an output itself labelled 78 plus a reset channel denoted by the numeral 80. A pulse amplifier 82 is connected to the output 78 and the amplified pulse is fed to a horizontal stretching circuit 84 having a time gate control or reset channel 86 which will be presently described in greater detail.

The rotatable shaft 26 has an aluminum disk 88 mounted thereon. Owing to the integral mounting of the disk 88 with respect to the shaft 26, it will be appreciated that the disk actually rotates in unison with the shaft 26 which shaft of course is driven by the motor 28. It should be explained at this time that the cavity 16 sweeps through a complete tuning range twice for each complete rotation of the shaft 26. This is so because the tuning blade or vane 24 produces a tuned output pulse as it enters the cavity via the slot 22 and a second pulse as it leaves this slot. To prevent ambiguity, only one of the sweeps is used to generate the display on the oscilloscope 50. Any cavity output generated by the other sweep is not used and therefore is prevented from entering the display circuits.

Having presented the above information, the role played by the disk 88 will be better understood. The disk 88 has embedded therein a small iron slug 90 and by proper orientation of a magnetic pick-up 92, it will be appreciated that a pulse will be generated when the cavity tuning blade or vane 24 is at the position of maximum insertion. Such position of maximum insertion is representative of the lowest frequency.

Connected to the pick-up 92 is a pulse amplifier 94, the output from the pulse amplifier 94 triggering a 1700 microsecond 1-shot multivibrator 96. The output from the multivibrator 96 is connected to various components, but at this time it is desired to point out that a gate stretching circuit 98 equipped with a time gate control or reset channel 100 is so connected. The output from the stretching circuit 98 is fed to the gated amplifier and trigger generator 66 by way of the second input 70 forming a part of this particular amplifier and generator.

Because of the above described arrangement, a cavity pulse occurring within a 1700 microsecond interval, this being the interval provided by the multivibrator 96 following a maximum insertion of the tuning vane 24, is actually gated into the demodulator 74. Since the time demodulator is connected to the horizontal deflecting plates 52 via the amplifier 82 and stretching circuit 84, such a signal will be displayed on the oscilloscope 50. A cavity output pulse occurring later than the selected interval is gated out and is thereby rendered ineffectual.

Also connected to the 1-shot multivibrator 96 is a 200 microsecond 1-shot multivibrator 102. The output from this last-mentioned multivibrator is connected directly to the reset channel 100 and the gate stretching circuit 98, and is also connected to a blanking amplifier 104. The blanking amplifier is in turn connected to the control grid 56 of the cathode ray oscilloscope 50. While a blanking operation is quite conventional, the specific need therefor in this system will be better understood as the disclosure progresses, especially when the operation of the tester is subsequently presented. At this time it should also be mentioned that the output from the multivibrator 96 is further connected to the reset channels 44, 80 and 86.

Summarizing what has been said immediately above, it will be explained that the trailing edge of the 1700 microsecond pulse produced by way of the multivibrator 96 is employed for the purpose of triggering the 200 microsecond multivibrator 102, thereby generating the desired blanking pulse that is impressed upon the control grid 56 of the oscilloscope. Although it has already been mentioned that the need for this will be better understood hereinafter, nonetheless the pulse so generated by the multivibrator 102 blanks the reset excursion of both the horizontal and vertical stretching circuits 42 and 84. By reason of the connection of the multivibrator 96 to the time demodulator 76, more specifically its reset channel 80, it will be understood that the multivibrator 96 has the responsibility of providing a reset pulse to the time demodulator as well as to the vertical stretching circuit 42 and the horizontal stretching circuit 86, as herein already mentioned.

Still another responsibilty of the multivibrator 96 is to trigger a pulse forming circuit 106 which has a vertical calibration switch 108 connected to its output. Through the agency of the calibration switch 108 a calibrated signal, that is one having a predetermined magnitude, is impressed upon the vertical deflecting plates 48 via the second input 36 to the pulse amplifier 32, the amplifier 40, the stretching circuit 42, and the adder 46.

Returning once again to the disk 88, it will be pointed out at this time that a second iron slug 110 is likewise embedded therein, this slug being at a different radius from the first mentioned slug 90. By virtue of the difference in radial location of the second slug 110, it will be appreciated that a second magnetic pick-up 112 can be employed which will be responsive to only the second slug 110 and not the slug 90. Through the agency of a pivotally mounted arm 114 having a shaft bearing 116 encircling a fixed shaft 117 on a common axis with the shaft 26, the pick-up 112 is rendered angularly adjustable relative to the pick-up 92. Since the pulse from the pick-up 92 corresponds to the low end of the sweep range of the cavity 16, the pulse from the displaced pick-up 112 corresponds to a particular cavity frequency. Inasmuch as the pick-up 112 is angularly adjustable, the frequency which it represents may be varied. To provide a means for indicating such frequency, a calibrated dial mechanism 118 is utilized so that the orientation of the pick-up 112 relative to said dial will provide the desired frequency indication. Step down gearing 119 couples the dial mechanism 118 to the shaft 26. Stated quite briefly, angular adjustment of the pick-up 112 will produce a pulse at any subsequent cavity frequency, and such frequency can be read on the dial 118.

Connected to the magnetic pick-up 112 is a pulse forming circuit 120. The output from the circuit 120 is transmitted to the second input 62 of the pulse amplifier 58 and is likewise impressed upon a 1200 microsecond 1-shot multivibrator 122. The output from the multivibrator 122 is directed to an integrator 124 having in turn connection to the adder 46. The multivibrator 122 and the integrator 124 constitute a form of sawtooth generator, developing, as the name implies, a sawtooth waveform. This waveform is applied to the vertical deflecting plates 48 of the oscilloscope 50 through the medium of the adder 46. Inasmuch as the sawtooth waveform occurs only during the deadtime interval of the cavity 16, no time conflict exists between the frequency marker derived from the pick-up 112 and the previously mentioned jammer output indication. Reset circuit 126 is used for resetting the integrator 124, the reset circuit receiving its signal from the previously mentioned 1-shot multivibrator 96.

Describing in more detail the production of the frequency marker, it will be understood that the 1-shot multivibrator 122 and the integrator 124 associated therewith provide a vertical deflection of the signal derived from the pick-up 112, whereas the second input 62 or pulse amplifier 58 and the ensuing previously mentioned circuitry connected to the output 64 of this amplifier 58 provides a horizontal deflecting signal which is applied to the horizontal deflecting plates 52.

It will also be observed that the testing apparatus includes what will be termed a count pulse stretching circuit 128 having a reset channel 130. The output from this particular circuit is fed to a D.-C. amplifier 132 and from this amplifier to a selective amplifier 134. To impart a square wave configuration to the signal, a Schmitt trigger circuit 136 is employed. A conventional electronic counter 138 counts the squared pulses delivered from the Schmitt trigger circuit 136. Inasmuch as the counter 138 may assume a variety of forms, its specific construction is not deemed necessary for an understanding of the invention. Actually, a number of binary counters are currently available on the market, and such a counter could well be utilized in the envisaged system. Also, some types of mechanical counters can be utilized which provide a visible indication of the number of pulses that have been forwarded from the Schmitt trigger circuit. The counter 138 is enabled for only a fixed interval, say, one minute by a counter timer 140. Through such an arrangement the counter 138 indicates the FM sweep rate of the jammer transmitter undergoing test.

Inasmuch as one display on the oscilloscope 50 that is possible with the present system consists of output power versus jammer frequency, such a display has been presented in the drawing. Accordingly, attention is now directed to FIG. 2 where power is represented by the ordinate and frequency by the abscissa. The calibrated movable frequency marker has been denoted by the reference numeral 142. Since the actual display with which we are interested appears as a series of dots, these dots have been collectively labelled 144. Each dot 144 represents the instantaneous amplitudes and frequency of the jammer output at the coincidence of the jammer undergoing test and the tuning of the cavity 16. It has already been stated that in the exemplified situation a 12,000 r.p.m. motor 28 is utilized. Hence the swept cavity rotates at approximately 12,000 r.p.m., this being the selected speed in this instance. More importantly, the speed the cavity is sweeping, under these assumed conditions, will be ten times faster than the maximum sweep speed of slow swept jammers. Consequently, at least 10 samples are taken during each cycle of jammer operation.

Describing still further the display appearing in FIG. 2, it will be pointed out that this particular display indicates the presence of modulation in the jammer output by the scattering of the dot pattern collectively denoted by the numeral 144. Amplitude modulation causes the pattern to be scattered vertically because the signal level is different each time the cavity sweeps through a particular frequency. On the other hand, frequency modulation is shown as a horizontal scattering.

An alternate time versus frequency display appears in FIG. 3. This can be used to determine the dwell period of the jammer at each frequency. The display is useful in the evaluation of the mechanical-hydraulic characteristics of the sweep-drive mechanism of relatively slow sweep rate jammers. Accordingly, the normal presentation has been presented in solid outline, bearing the reference numeral 146, whereas abnormal presentation, that is, low hydraulic fluid, has been illustrated in dotted outline, this latter presentation bearing the reference numeral 148.

Throughout the description various stretching circuits have been mentioned. These stretching circuits would not be used when the jammer sweep rate exceeds that of the swept cavity. In such instances the detected radio-frequency output voltage from the cavity 16 would be applied to the oscilloscope 50, the stretching circuits 42 and 84 then being bypassed.

Having presented a considerable amount of operational detail in the foregoing description, the over-all operation of our testing apparatus should be readily understood from what has already been given. Nonetheless, a very brief résumé of what takes place will be of additional help, it is believed. Thus, with the hood 14 placed over the jammer antenna 12, and with the motor 28 energized, it will be appreciated that the blade or vane 24 will be repeatedly introduced into the slot 22 centered at the voltage maxima. Each time that a tuning or resonance condition exists an output will be forwarded via the terminal 20 to the crystal detector 30. Such an output is processed via two separate channels, one leading to the vertical deflecting plates 48 and the other to the horizontal deflecting plates 52.

As hereinbefore indicated, the blade or vane 24 will produce two output pulses, one as it enters the slot and one as it leaves the slot. It is because of this happening that a gating circuit is added to the system. The 1-shot multivibrator 96 has an operating interval of 1700 microseconds which assures that only one cavity output pulse is made available for processing. This interval is purposely so short that the second pulse will not appear in the display. Actually, the cavity output pulse that is utilized is the one following maximum insertion of the tuning vane 24 and not the one produced as this vane enters the slot.

The frequency marker 142 is produced so as to provide a visible signal having a relative location with respect to the actual signal produced from the cavity output pulse. It is the relationship of these two signals when displayed on the oscilloscope 50 that permits a visual discernment of the frequency of the cavity output pulse and hence the frequency at which the jammer transmitter is operating.

The functioning of the counter 138 and the counter timer 140 has already been alluded to. This counting circuitry can be operated to determine an accurate count of the jammer sweep speed simultaneously with the presenting of either of the two displays depicted in FIGS. 2 and 3.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:
1. Broadband spectrum analyzing apparatus for testing radio-frequency equipment, the apparatus comprising a cavity having an input terminal for receiving a signal from the equipment undergoing test and an output terminal, means for sweeping said cavity to provide a cavity output pulse via said output terminal at the operating frequency of said equipment, a cathode ray oscilloscope having vertical and horizontal deflecting means, a detector connected to said output terminal, means interposed between said detector and said vertical deflecting means for applying a deflecting signal to said vertical deflecting means having a magnitude proportional to the magnitude of the detected signal and hence proportional to said cavity output pulse, means including a time demodulator interposed between said detector and said horizontal deflecting means for applying a deflecting signal to said horizontal deflecting means having a magnitude proportional to the time of occurrence of said output pulse, means responsive to a given position of said sweep means for producing a reference signal indicative of said given position, means for applying a derivative of said reference signal to said vertical deflecting means, and means for applying a derivative of said reference signal to said horizontal deflecting means, whereby the physical relationship of the visual signal on said oscilloscope produced by said first-mentioned vertical and horizontal deflecting signals to the visual signal produced by those deflecting signals derived from said reference signal will provide an indication of the magnitude of said operating frequency.

2. Broadband spectrum analyzing apparatus for testing radio-frequency equipment in accordance with claim 1 in which said means for applying a derivative of the reference signal to the vertical deflecting means includes a sawtooth generator and in which said means for applying a derivative of the reference signal to the horizontal deflecting means is connected to said means that includes the time demodulator so that the derivative of the reference signal applied to the horizontal deflecting means is applied via said time demodulator.

3. Broadband spectrum analyzing apparatus for testing radio-frequency equipment in accordance with claim 1 in which said responsive means is adjustable so that a preferred given position may be selected.

4. Broadband spectrum analyzing apparatus for testing radio-frequency equipment, the apparatus comprising a cavity having coaxial input and output terminals, the cavity being formed with a slot centered at the voltage maxima, a rotatable shaft, a blade on said shaft disposed for variable degrees of insertion into said cavity via said slot as said shaft is rotated, a cathode ray oscilloscope having vertical and horizontal deflecting means, means responsive to a given rotative position of said shaft for applying a signal to said vertical and horizontal deflecting means to provide a visible reference signal on said oscilloscope, means connected to said output terminal for applying a deflecting signal to said vertical deflecting means having a magnitude proportional to the magnitude of an output pulse generated when said blade has been inserted to a degree such as to produce a tuned condition of said cavity for an input signal received via said input terminal from the equipment undergoing test, and means connected to said output terminal for applying a deflecting signal to said horizontal deflecting means having a magnitude proportional to the time of occurrence of said output pulse, whereby the relationship of the visible signal in the oscilloscope produced by said last-mentioned vertical and horizontal deflecting signals with said visible reference signal is indicative of the operating frequency of the equipment being tested.

5. Broadband spectrum analyzing apparatus for testing radio-frequency equipment in accordance with claim 4 including means for angularly adjusting the position of said first mentioned means for applying a signal so as to selectively change said given position.

6. Broadband spectrum analyzing apparatus for testing radio-frequency equipment in accordance with claim 4 in which said responsive means includes a non-magnetic disk mounted on said shaft for rotation in unison therewith, a magnetic slug carried by said disk, and a magnetic pickup excitable by said slug as said disk rotates relative thereto.

7. Broadband spectrum analyzing apparatus for testing radio-frequency equipment in accordance with claim 6 including a second slug carried by said disk at an angular position corresponding to maximum insertion of said blade, said second slug being at a different radial location on said disk from the first slug, a second magnetic pickup excitable by said second slug, and means associated with said second magnetic pickup for permitting energization of said horizontal deflecting means by said output pulse only within a certain interval initiated by the excitation of said second pickup by said second slug.

8. Broadband spectrum analyzing apparatus for testing radio-frequency equipment, the apparatus comprising a cavity having coaxial input and output terminals, the cavity being formed with a slot centered at the voltage maxima, a rotatable shaft, a blade on said shaft disposed for variable degrees of insertion into said cavity via said slot as said shaft is rotated, a cathode ray oscilloscope having vertical and horizontal deflecting means, a detector connected to said output terminal, pulse amplifying means connected to said detector, means connected to said amplifying means for applying a deflecting signal to said vertical deflecting means having a magnitude proportional to the magnitude of an output pulse generated when said blade has been inserted to a degree such as to produce a tuned condition of said cavity for an input signal received via said input terminal from the equipment undergoing test, a gate having a pair of inputs and an output, one input being connected to said amplifying means, a time demodulator connected between said gate output and the horizontal deflecting means for applying a deflecting signal to said horizontal deflecting means having a magnitude proportional to the time of occurrence of said cavity output pulse, and means responsive to the rotation of said shaft connected to the second input of said gate for applying a gating signal to said gate only during a prescribed interval, whereby a horizontal deflecting signal is applied only once during a complete revolution of said shaft and hence only once during a complete insertion and withdrawal of said blade.

9. Broadband spectrum analyzing apparatus for testing radio-frequency equipment in accordance with claim 8 including means triggered by said rotation responsive means at the end of said interval for blanking said oscilloscope.

10. Broadband spectrum analyzing apparatus for testing radio-frequency equipment in accordance with claim 8 including additional means responsive to the rotation of said shaft for applying reference deflecting signals to said respective deflecting means, whereby the relative position of the resulting visual signal with respect to the visual signal which is proportional to the magnitude of the cavity input pulse will provide an indication of the tuned frequency at which said cavity pulse occurs.

11. Broadband spectrum analyzing apparatus for testing radio-frequency equipment in accordance with claim 8 including counting means connected to said time demodulator for counting the signals forwarded therefrom, the count registration during a given time interval providing an indication of the sweep rate of the equipment undergoing test.

UNITED STATES PATENTS

References Cited in the file of this patent

| | | |
|---|---|---|
| 2,380,791 | Rosencrano | July 31, 1945 |
| 2,473,426 | Halpern | June 14, 1949 |
| 2,479,222 | Edlen | Aug. 16, 1949 |
| 2,592,235 | Bischoff | Apr. 8, 1952 |
| 2,774,035 | Richmond et al. | Dec. 11, 1956 |
| 2,807,798 | Dunnington | Sept. 24, 1957 |

FOREIGN PATENTS

| | | |
|---|---|---|
| 770,280 | Great Britain | Mar. 20, 1957 |

OTHER REFERENCES

"A Frequency Meter for Microwave Spectroscopy," article in The Review of Scientific Instruments, December 1950, pages 1014–1015.